United States Patent
Martinez et al.

(10) Patent No.: US 11,610,275 B1
(45) Date of Patent: Mar. 21, 2023

(54) SYSTEM AND METHODS FOR CUSTOMER RELATIONSHIP MANAGEMENT FOR AN ENERGY PROVIDER

(71) Applicant: Ambit Holdings, L.L.C., Dallas, TX (US)

(72) Inventors: David V. Martinez, Dallas, TX (US); John Burke, Dallas, TX (US)

(73) Assignee: BLUENET HOLDINGS, LLC, Irving, TX (US)

( * ) Notice: Subject to any disclaimer, the term of this patent is extended or adjusted under 35 U.S.C. 154(b) by 808 days.

(21) Appl. No.: 14/050,499

(22) Filed: Oct. 10, 2013

Related U.S. Application Data

(63) Continuation-in-part of application No. 13/892,706, filed on May 13, 2013, now Pat. No. 10,650,359,
(Continued)

(51) Int. Cl.
*G06Q 50/06* (2012.01)
*G06Q 20/10* (2012.01)

(52) U.S. Cl.
CPC .......... *G06Q 50/06* (2013.01); *G06Q 20/102* (2013.01)

(58) Field of Classification Search
CPC .............................. G06Q 50/06; G06Q 20/102
(Continued)

(56) References Cited

U.S. PATENT DOCUMENTS

| 3,231,670 A | 1/1966 | Lane et al. |
| 4,509,128 A | 4/1985 | Coppola et al. |

(Continued)

FOREIGN PATENT DOCUMENTS

| WO | 0150313 A1 | 7/2001 |
| WO | 0165823 A1 | 9/2001 |

(Continued)

OTHER PUBLICATIONS

Ambit Energy Alteryx User cases (Sep. 9, 2015, 22 pages, retrieved from http://www.slideshare.net/Alteryx/ambit-energy-alteryx-user-cases).*

(Continued)

*Primary Examiner* — James D Nigh
(74) *Attorney, Agent, or Firm* — Schultz & Associates, P.C.

(57) ABSTRACT

Systems and methods are disclosed for a customer relationship management system for a retail electric energy provider. A customer valuation engine is applied to evaluate customer data to make customer valuations, continuously or on-demand, in support of customer service through a call center. In a preferred embodiment, monthly average profitability is determined as one customer valuation and probability of attrition is determined as another customer valuation. A customer retention matrix and a customer treatment matrix are developed based constructing a graph of customer monthly average profitability and probability of attrition. The customer retention matrix provides a set of instructions to a call center operator to aid the operator in communicating with the customer while helping retain the customer. The customer treatment matrix provides a set of instructions to a call center operator to aid the operator in communicating with a customer about late bills, disconnects and other treatment situations.

18 Claims, 8 Drawing Sheets

Customer Valuation, Treatment and Retention

Related U.S. Application Data which is a continuation-in-part of application No. 11/899,197, filed on Sep. 4, 2007, now Pat. No. 8,442,917.

(58) Field of Classification Search
USPC .......................................................... 705/40
See application file for complete search history.

(56) References Cited

U.S. PATENT DOCUMENTS

| | | | |
|---|---|---|---|
| 5,943,656 | A | 8/1999 | Crooks et al. |
| 6,018,726 | A | 1/2000 | Tsumura |
| 6,088,688 | A | 7/2000 | Crooks et al. |
| 6,240,167 | B1 | 5/2001 | Michaels |
| 6,343,277 | B1* | 1/2002 | Gaus ...................... G06Q 40/00 705/26.4 |
| 6,366,889 | B1 | 4/2002 | Zaloom |
| 6,618,709 | B1* | 9/2003 | Sneeringer ......... G06Q 30/0283 705/406 |
| 7,043,459 | B2 | 5/2006 | Peevey et al. |
| 7,117,172 | B1 | 10/2006 | Black |
| 7,149,707 | B2 | 12/2006 | Scoble |
| 7,233,843 | B2 | 6/2007 | Budhraja et al. |
| 8,880,231 | B2* | 11/2014 | Boucher ................ G06Q 50/06 700/286 |
| 2002/0120519 | A1 | 8/2002 | Martin et al. |
| 2003/0009401 | A1 | 1/2003 | Ellis |
| 2003/0046252 | A1 | 3/2003 | Spool et al. |
| 2003/0149603 | A1* | 8/2003 | Ferguson ............... G06Q 30/06 705/64 |
| 2003/0182187 | A1 | 9/2003 | Scoble |
| 2004/0070894 | A1* | 4/2004 | Beasley, III ............. H02B 1/52 361/42 |
| 2004/0093200 | A1* | 5/2004 | Scott ...................... G06F 40/284 704/9 |
| 2004/0133514 | A1 | 7/2004 | Zielke et al. |
| 2004/0143464 | A1 | 7/2004 | Houle |
| 2004/0179672 | A1 | 9/2004 | Pagel et al. |
| 2005/0004858 | A1* | 1/2005 | Foster .................... G06Q 10/06 705/36 R |
| 2005/0174708 | A1* | 8/2005 | Price ........................ H02B 1/52 361/62 |
| 2005/0187888 | A1 | 8/2005 | Sherman et al. |
| 2005/0192897 | A1 | 9/2005 | Rogers et al. |
| 2006/0001414 | A1 | 1/2006 | Angerame et al. |
| 2006/0026017 | A1 | 2/2006 | Walker |
| 2006/0036501 | A1 | 2/2006 | Shahbazi et al. |
| 2006/0161450 | A1 | 7/2006 | Carey et al. |
| 2006/0173779 | A1 | 8/2006 | Bennett et al. |
| 2006/0206425 | A1 | 9/2006 | Sharma |
| 2006/0256951 | A1 | 11/2006 | Rodenbusch et al. |
| 2007/0112579 | A1* | 5/2007 | Ratnakaran ............ G06Q 30/06 705/1.1 |
| 2007/0250384 | A1 | 10/2007 | Geller et al. |
| 2007/0260562 | A1 | 11/2007 | Hutson et al. |
| 2008/0091626 | A1 | 4/2008 | Kremen |
| 2008/0319777 | A1 | 12/2008 | Hoff |
| 2009/0276289 | A1* | 11/2009 | Dickinson ............ G06Q 10/063 705/7.29 |
| 2009/0307074 | A1* | 12/2009 | Sharma .............. G06Q 30/0224 705/7.34 |
| 2011/0264291 | A1* | 10/2011 | Le Roux ................ G06Q 50/06 700/291 |
| 2012/0095841 | A1* | 4/2012 | Luckerman ............ G06Q 30/06 705/14.66 |
| 2012/0136780 | A1 | 5/2012 | El-Awady et al. |
| 2014/0067461 | A1* | 3/2014 | Zhang ................ G06Q 10/0635 705/7.28 |
| 2014/0200930 | A1* | 7/2014 | Zizzamia ............... G16H 50/50 705/4 |

FOREIGN PATENT DOCUMENTS

| | | |
|---|---|---|
| WO | 0177973 A2 | 10/2001 |
| WO | 2006119185 A2 | 11/2006 |

OTHER PUBLICATIONS

Business Intelligence: A Design Science Perspective, Salvatore T. March, David K Wilson Professor of Management, Owen Graduate School of Management, Vanderbilt University, Apr. 21, 2010, 93 pages).*
"Business Intelligence", A Design Science Perspective, Salvatore T. March, David K Wilson Professor of Management, Owen Graduate School of Management, Vanderbilt University, Apr. 21, 2010, 93 pages) (Year: 2010).*
ERCOT Protocols Sep. 1, 2007_Protocols, Retail Market Guide, Texas SET, Sep. 1, 2007, 848 pages (Year: 2007).*
T650_02: Service Order Complete Unexecutable, Reject Response or Notification of Permit Required, Version 3.0, Texas Standard Electronic Transaction, Jun. 25, 2007, 50 pages (Year: 2007).*
T810_02: TDSP to CR Invoice, Version 3.0, Texas Standard Electronic Transaction, Jun. 25, 2007, 47 pages (Year: 2007).*
T810_03: Muni / Co-op Invoice, Version 3.0, Texas Standard Electronic Transaction, Jun. 25, 2007, 44 pages (Year: 2007).*
T814_01: Enrollment Request, Version 3.0, Texas Standard Electronic Transaction, Jun. 25, 2007, 35 pages (Year: 2007).*
T814_02: Enrollment Reject Response, Version 3.0, Texas Standard Electronic Transaction, Jun. 25, 2007, 19 pages (Year: 2007).*
T814_04: Switch CR Notification Response, Version 2.1, Texas Standard Electronic Transaction, Mar. 1, 2005, 50 pages (Year: 2005).*
T814_05: Premise Information and Enrollment Response, Version 3.0, Texas Standard Electronic Transaction, Jun. 25, 2007, 46 pages (Year: 2007).*
T814_10: Drop to AREP Request, Version 3.0, Texas Standard Electronic Transaction, Jun. 25, 2007, 30 pages (Year: 2007).*
T814_15: Drop Enrollment Request, Version 2.1, Texas Standard Electronic Transaction, Mar. 1, 2005, 20 pages (Year: 2005).*
T814_16: Move In Request, Version 3.0, Texas Standard Electronic Transaction, Jun. 25, 2007, 37 pages (Year: 2007).*
T814_24: Move Out Request, Version 3.0, Texas Standard Electronic Transaction, Jun. 25, 2007, 30 pages (Year: 2007).*
T814_25: Move Out Response, Version 3.0, Texas Standard Electronic Transaction, Jun. 25, 2007, 23 pages (Year: 2007).*
T814_27: Ad-Hoc Historical Usage Response, Version 3.0, Texas Standard Electronic Transaction, Jun. 25, 2007, 22 pages (Year: 2007).*
T824: Application Advice, Version 3.0, Texas Standard Electronic Transaction, Jun. 25, 2007, 22 pages (Year: 2007).*
T867_02: Historical Usage, Version 3.0, Texas Standard Electronic Transaction, Jun. 25, 2007, 62 pages (Year: 2007).*
T867_03: Monthly Usage, Version 3.0, Texas Standard Electronic Transaction, Jun. 25, 2007, 108 pages (Year: 2007).*
T867_04: Initial Meter Read Notification, Version 3.0, Texas Standard Electronic Transaction, Jun. 25, 2007, 22 pages (Year: 2007).*
Texas SET 814 07: Drop Due to Switch Response dated Jun. 25, 2007.
Texas SET 814 08: Cancel Switch Request dated Jun. 25, 2007.
Texas SET 814 09: Cancel Switch Response dated Jun. 25, 2007.
Texas SET 814 10: Drop to AREP Request dated Jun. 25, 2007.
Texas SET 814 11: Drop Response dated Jun. 25, 2007.
Texas SET 814 12: Date Change Request dated Jun. 25, 2007.
Texas SET 814 13: Date Change Response dated Jun. 25, 2007.
Texas SET 814 14: Drop Enrollment Request dated Jun. 25, 2007.
Texas SET 814 15: Drop Enrollment Response dated Jun. 25, 2007.
Texas SET 814 16: Move In Request dated Jun. 25, 2007.
Texas SET 814 17: Move In Reject Response dated Jun. 25, 2007.
Texas SET 814 18: Establish/Delete Continuous Service Agreement (CSA) Request dated Jun. 25, 2007.
Texas SET 814 19: Establish/Delete Continuous Service Agreement (CSA) Response dated Jun. 25, 2007.

(56) References Cited

OTHER PUBLICATIONS

Texas SET 814 20: Create/Maintain/Retire ESI ID Request dated Jun. 25, 2007.
Texas SET 814 21: Create/Maintain/Retire ESI ID Response dated Jun. 25, 2007.
Texas SET 814 22: Continuous Service Agreement (CSA) CR Move In Request dated Jun. 25, 2007.
Texas SET 814 23: Continuous Service Agreement (CSA) CR Move In Response dated Jun. 25, 2007.
Texas SET 814 24: Move Out Request dated Jun. 25, 2007.
Texas SET 814 25: Move Out Response dated Jun. 25, 2007.
Texas SET 814 26: Ad-Hoc Historical Usage Request dated Jun. 25, 2007.
Texas SET 814 27: Ad-Hoc Historical Usage Response dated Jun. 25, 2007.
Texas SET 814 28: Complete Unexecutable or Permit Required dated Jun. 25, 2007.
Texas SET 814 29: Response to Complete Unexecutable or Permit Required dated Jun. 25, 2007.
Texas SET 814 PC: Maintain Customer Information Request dated Jun. 25, 2007.
Texas SET 814 PD: Maintain Customer Information Response dated Jun. 25, 2007.
Texas SET 820 02: Remittance Advice dated Jun. 25, 2007.
Texas SET 820 03: Muni/ Co-op Remittance Advice dated Jun. 25, 2007.
Texas SET 824: Application Advice dated Jun. 25, 2007.
Texas SET 867 02: Historical Usage dated Jun. 25, 2007.
Texas SET 867 03: Monthly Usage dated Jun. 25, 2007.
Texas SET 867 04: Initial Meter Read Notification dated Jun. 25, 2007.
Texas SET 997: Functional Acknowledgement dated Jun. 25, 2007.
Texas SET Change Request Form: Change Control #2004-674 dated Dec. 8, 2004.
Texas SET Change Request Form: Change Control #2004-678 dated Dec. 3, 2004.
Texas SET Change Request Form: Change Control #2005-687 dated Mar. 9, 2005.
Texas SET Change Request Form: Change Control #2006-691 dated Jun. 6, 2006.
Texas SET 650 02: Service Order Complete, Complete Unexecutable, Reject Response or Notification of Permit Required.
Texas SET 650 04: Suspension of Delivery Service Notification or Cancellation.
Texas SET 810 02: TDSP to CR Invoice.
Texas SET 814 PC: Maintain Customer Information Request.
Texas SET 820 02: Remittance Advice.
Texas SET 867 03: Monthly Usage.
Texas SET Change Request Form: Change Control #2006-692 dated Jun. 7, 2006.
Texas SET 814 15: Affiliated Retail Electric Provider (AREP) Drop Enrollment Response.
Texas SET 814 19: Establish/Delete Continuous Service Agreement (CSA) Response.
Texas SET 814 25: Move Out Response.
Texas SET 814 27: Ad-Hoc Historical Usage Response.
Texas SET 814 28: Complete Unexecutable or Permit Required.
Texas SET Change Request Form: Change Control #2006-693 dated Jul. 3, 2006.
Texas SET Change Request Form: Change Control #2006-694 dated Jul. 10, 2006.
Texas SET Change Request Form: Change Control #2006-696 dated Jul. 17, 2006.
Texas SET Change Request Form: Change Control #2006-697 dated Jul. 17, 2007.
Texas SET Change Request Form: Change Control #2006-698 dated Jun. 19, 2006.
Texas SET Change Request Form: Change Control #2006-699 dated Jul. 3, 2006.
Texas SET Change Request Form: Change Control #2006-700 dated Aug. 23, 2006.
Texas SET Change Request Form: Change Control #2006-701 dated Aug. 22, 2006.
Texas SET Change Request Form: Change Control #2006-702 dated Aug. 23, 2006.
Texas SET Change Request Form: Change Control #2006-703 dated Aug. 24, 2006.
Texas SET Change Request Form: Change Control #2007-704 dated Jan. 31, 2007.
Texas SET Change Request Form: Change Control #2006-708 dated Jun. 5, 2007.
Texas SET Change Request Form: Change Control #2007-712 dated Jul. 9, 2007.
Texas SET 814 04: Switch CR Notification Response.
Texas SET 814 08: Cancel Switch Request.
Texas SET 814 14: Affiliated Retail Electric Provider (AREP) Drop Enrollment Request.
"Oracle Advanced Collections User Guide", Release 11, Part No. B19161-02, Oct. 2005, 148 pages, Oracle Corporation.
ERCOT Protocols—Sep. 1, 2007, published by the Electric Reliability Council of Texas, 848 pages.
ERCOT Protocols Retail Market Guide, Jun. 25, 2007, Electric Reliability Council of Texas, 187 pages.
Texas SET Swimlanes Customer Switch Scenarios dated Apr. 12, 2005.
Texas SET Swimlanes Customer Move Out Scenarios dated Apr. 12, 2005.
Texas SET Swimlanes Billing Scenarios dated Feb. 13, 2007.
Texas SET Swimlanes Customer Move In Scenarios dated Apr. 12, 2005.
Texas SET Swimlanes CSA Scenarios dated Apr. 12, 2005.
Texas SET Swimlanes Provider of Last Resort Scenarios dated Apr. 12, 2005.
Texas SET Swimlanes Establish Maintain ESI Scenarios dated Apr. 20, 2005.
Texas SET Swimlanes AD Hoc Historical Usage Scenarios dated Apr. 12, 2005.
Texas SET Swimlanes H1 Maintain Customer Information dated Apr. 12, 2005.
Texas SET Swimlanes Service Order Scenarios dated Apr. 12, 2005.
Texas SET Swimlanes Billing Scenarios dated Apr. 12, 2005.
Texas SET Swimlanes Notification of Suspension Scenarios dated Apr. 12, 2005.
Texas SET Swimlanes Unplanned Outage Scenarios dated Apr. 12, 2005.
Texas SET Swimlanes MIMO Cancellation Scenarios dated Apr. 12, 2005.
Texas SET Swimlanes MIMO Cancellation Scenarios dated Feb. 13, 2007.
Texas SET Swimlanes MIMO Concurrent Processing Scenarios dated Apr. 12, 2005.
Texas SET Swimlanes Move In dated Dec. 8, 2008.
Texas SET 650 01: Service Order Request dated Jun. 25, 2007.
Texas SET 650 02: Service Order Complete, Complete Unexecutable, Reject Response or Notification of Permit Required dated Jun. 25, 2007.
Texas SET 650 04: Suspension of Delivery Service Notification or Cancellation dated Jun. 25, 2007.
Texas SET 650 05: Suspension of Delivery Service Reject Response dated Jun. 25, 2007.
Texas SET 810 02: TDSP to CR Invoice dated Jun. 25, 2007.
Texas SET 810 03: Muni / Co-op Invoice dated Jun. 25, 2007.
Texas SET 814 01: Enrollment Request dated Jun. 25, 2007.
Texas SET 814 02: Enrollment Reject Response dated Jun. 25, 2007.
Texas SET 814 03: Switch CR Notification Request dated Jun. 25, 2007.
Texas SET 814 04: Switch CR Notification Response dated Jun. 25, 2007.
Texas SET 814 05: Premise Information and Enrollment Response dated Jun. 25, 2007.

(56) References Cited

OTHER PUBLICATIONS

Texas SET 814 06: Drop Due to Switch Request dated Jun. 25, 2007.

* cited by examiner

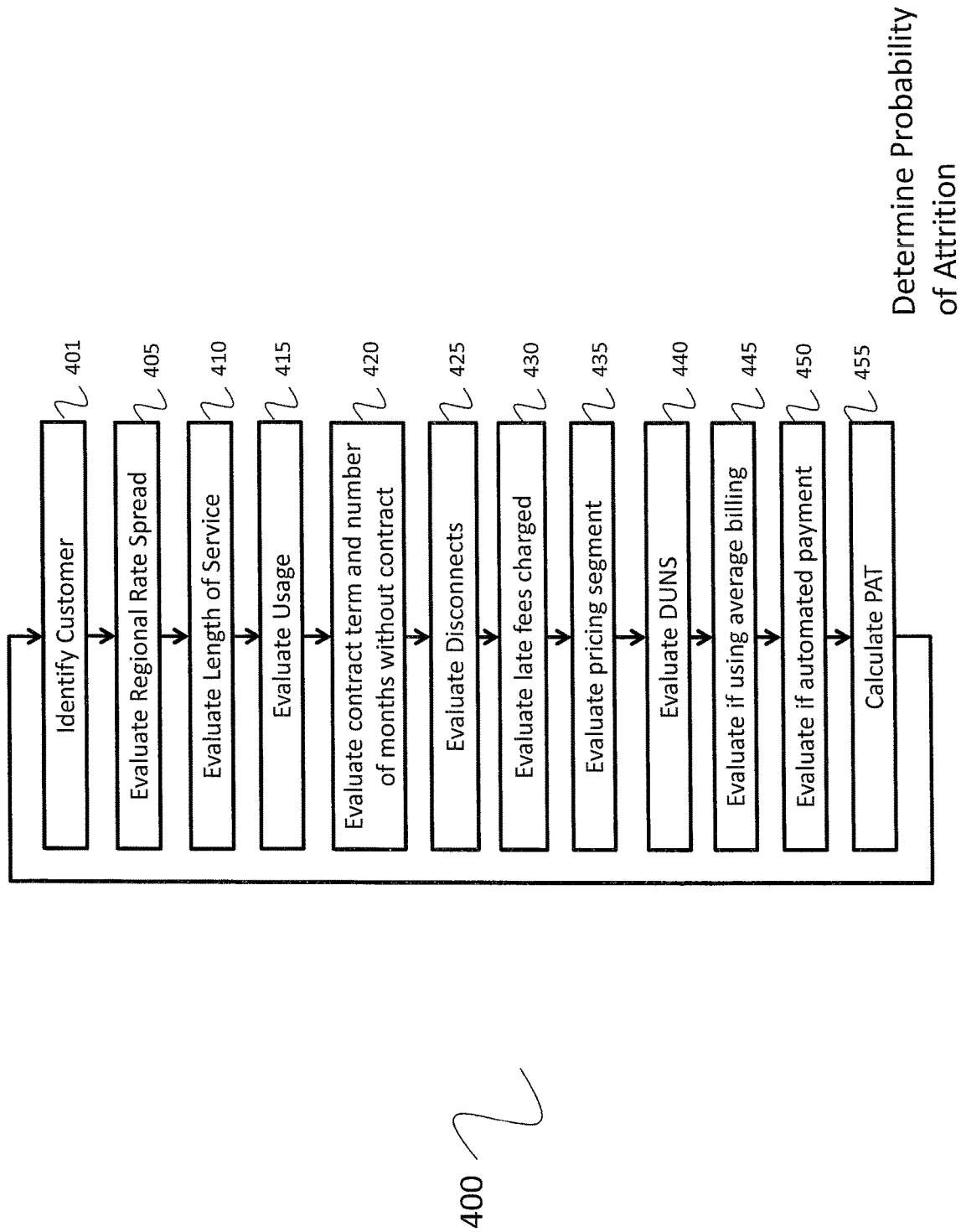

SYSTEM AND METHODS FOR CUSTOMER RELATIONSHIP MANAGEMENT FOR AN ENERGY PROVIDER

CROSS REFERENCE TO RELATED APPLICATIONS

This is a continuation-in-part of application Ser. No. 13/892,706 filed May 13, 2013, which is a continuation-in-part of application Ser. No. 11/899,197 filed Sep. 4, 2007, now U.S. Pat. No. 8,442,917. Each patent application identified above is incorporated here by reference in its entirety to provide continuity of disclosure.

FIELD OF INVENTION

The present inventions relate generally to systems for management of customers, sales agents and energy usage information for an energy provider.

BACKGROUND OF THE INVENTION

In the 1990s, groups of utilities along with their federal and state regulators began forming independent system operators (ISOs) or regional transmission organizations (RTOs) as states and regions in the United States established wholesale competition for electricity. The ISO and/or RTO (hereafter Energy Market Operator, EMO) coordinate generation and transmission of electric power across wide geographic regions, matching generation to load instantaneously to balance the supply of and demand for electricity. These organizations forecast load and schedule generation to assure sufficient capacity and back-up power in case demand rises, a power-plant goes offline or a power line is lost. The primary role of the EMO is to ensure equal access to the power grid for non-utility firms, enhance the reliability of the transmission system and operate wholesale electricity markets. The markets control the flow of money between wholesale producers, marketers, transmission and distribution service providers (TDSP), owners and buyers including other EMOs.

TDSP entities are generally responsible for the transmission and distribution of energy through power lines that they maintain and typically own. The TDSP entities typically own the metering devices attached to residential and commercial customer's facility, servicing the meters and reading them periodically.

A Public Utilities Commission (PUC) regulates the delivery of electricity including reliability and safety, rates and terms, setting the operating standards for the TDSPs. The PUC typically oversees the regional EMO market, for example by reviewing proposals for new transmission facilities or generators. The PUC enforces rules and regulations for retail competition, including customer protections, pricing rules and the implementation of energy goals. The PUC also regulates licensing and rules enforcement.

An example of an EMO is the Energy Reliability Council of Texas (ERCOT) which manages the Texas power grid, an example of a TDSP is TXU Energy Delivery; an example of a PUC is the Texas Public Utilities Commission.

The operation of a wholesale electricity market by the EMO enables local retail electricity providers (REPs) to buy and sell electricity. The market supplies the REPs with a means for meeting consumer needs for power at the lowest possible costs. An example of a REP is Ambit Energy, Inc. of Dallas, Tex. REPs have need for an accurate and continuous information exchange with EMOs including data such as market transactions, historical or current load information and customer specific transactions (e.g., connect or disconnect orders, meter readings, etc.).

REPs have certain requirements typically set by the relevant state utilities commission to have adequate technical resources to provide continuous and reliable electric service to customers in its service area and for the technical and managerial ability for supplying electric service in accordance with its customer contracts. Minimum technical resources generally include the capability to comply with EMO requirements for all scheduling, operating, planning, reliability, customer registration policies, and settlement policies. The REP must have the ability to meet EMO requirements for coordination with control centers for scheduling changes, reserve implementation, curtailment orders, interruption plan implementation and escalation procedures. The REP must also meet certain financial standards relating to the protection of its customers and sufficient for accurate billing and collection from its customers.

An example of a set of requirements for REPs is the Texas state PUC document: P.U.C. SUBST. R.25, "Substantive Rules Applicable to Electric Service Providers," Chapter 25.

There is a significant amount of information that must be managed and serviced on a real-time basis (often minute to minute) by a REP to meet the minimum technical requirements. For example, energy costs fluctuate rapidly with time. Data related to energy cost is provided in 15 minute intervals. The 15 minute intervals are known in the industry as "blocks." The REP purchases blocks to meet the demands of its customers in advance according to a forecast. The forecast requires accurate correlation between customer usage and energy cost for any given block and geographical area.

The REP is also responsible for providing adequate customer service, informing its customers of treatment situations, as well as managing its profitability.

Accordingly, the REP requires a system to manage market transactions with the EMO, apply business rules and requirements, apply ratings to usage, perform customer analysis and manage customer relationships through customer service systems and call centers, perform customer billing including customer protective measures in collection, process customer payments, manage third party sales and marketing subsystems and manage customer acquisition and residual income systems.

SUMMARY

Systems and methods are disclosed for a customer relationship management system for a retail electric energy provider. A customer valuation engine is applied to evaluate customer data to make particular customer valuations, continuously or on-demand, in support of customer service through a call center. In a preferred embodiment, monthly average profitability is determined as one customer valuation and probability of attrition is determined as another customer valuation. A customer retention matrix and a customer treatment matrix are developed based on customer monthly average profitability and probability of attrition. The customer retention matrix provides a set of instructions to a call center operator to aid the operator in communicating with the customer while aiding customer retention. The customer treatment matrix provides a set of instructions to a call center operator to aid the operator in communicating with a customer about late bills, disconnects and other treatment situations.

BRIEF DESCRIPTION OF DRAWINGS

The disclosure inventions will be described with reference to the accompanying drawings.

FIG. 4 is a flow chart of a method to determine probability of attrition of an energy customer.

DETAILED DESCRIPTION OF PREFERRED EMBODIMENTS

Figure 1:
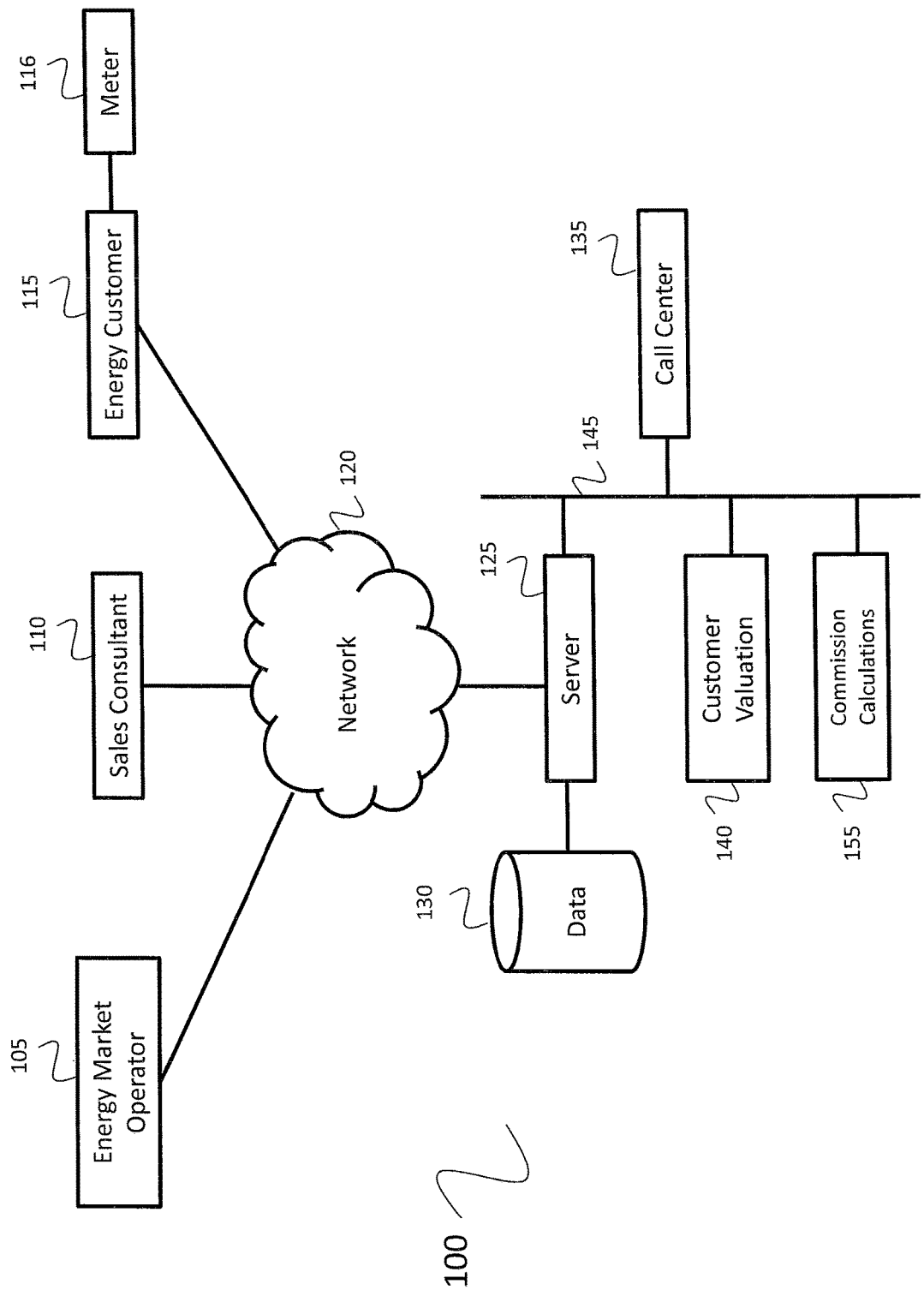
FIG. 1 is a block diagram of a customer valuation system for a retail energy provider.

The numerous innovative teachings of the present application will be described with particular reference to the presently preferred embodiments (by way of example, and not of limitation).

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, C++, C#, .NET, Objective C, Ruby, Python SQL, or other modem and commercially available programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, system 100 for customer relationship management for a set of customers is shown for managing customer retention and treatment.

A server 125 operated by an energy provider is connected by a network 120 to an energy market operator 105, a sales agent 110, a set of energy customers 115 with a set of energy meters 116 installed at the energy customer's premises to measure consumption of energy. Energy meters 116 may be traditional mechanical meters or electronic (smart) meters to measure consumption of energy.

Server 125 comprises a set of processors and a set of instructions in a memory that implement a customer valuation engine 140 and a commissions engine 155 connected by an internal network 145 to the server. A call center 135 is also connected by internal network 145 to the server and the customer valuation engine 140. The call center further comprises a set of client computers that access customer valuation engine 140. In a preferred embodiment, customer valuation engine 140 and commissions engine 155 are implemented on separate machines connected to a main server through internal network 145. Server 125 further comprises a database 130 to manage a set of data for customer valuation engine 140, commissions engine 155 and call center 135. For example, database 130 stores and accesses a set of customer data records including a set of records for energy customer 115. The set of records include a record of basic customer information such as address and meter identifier, a set of historical usage records and a set of records holding customer valuation data.

The set of historical energy usages are generated by the energy market operator for energy customer 115. Each historical energy usage is a set of energy readings measured by the energy meter and reported periodically to the energy market operator.

Figure 2:
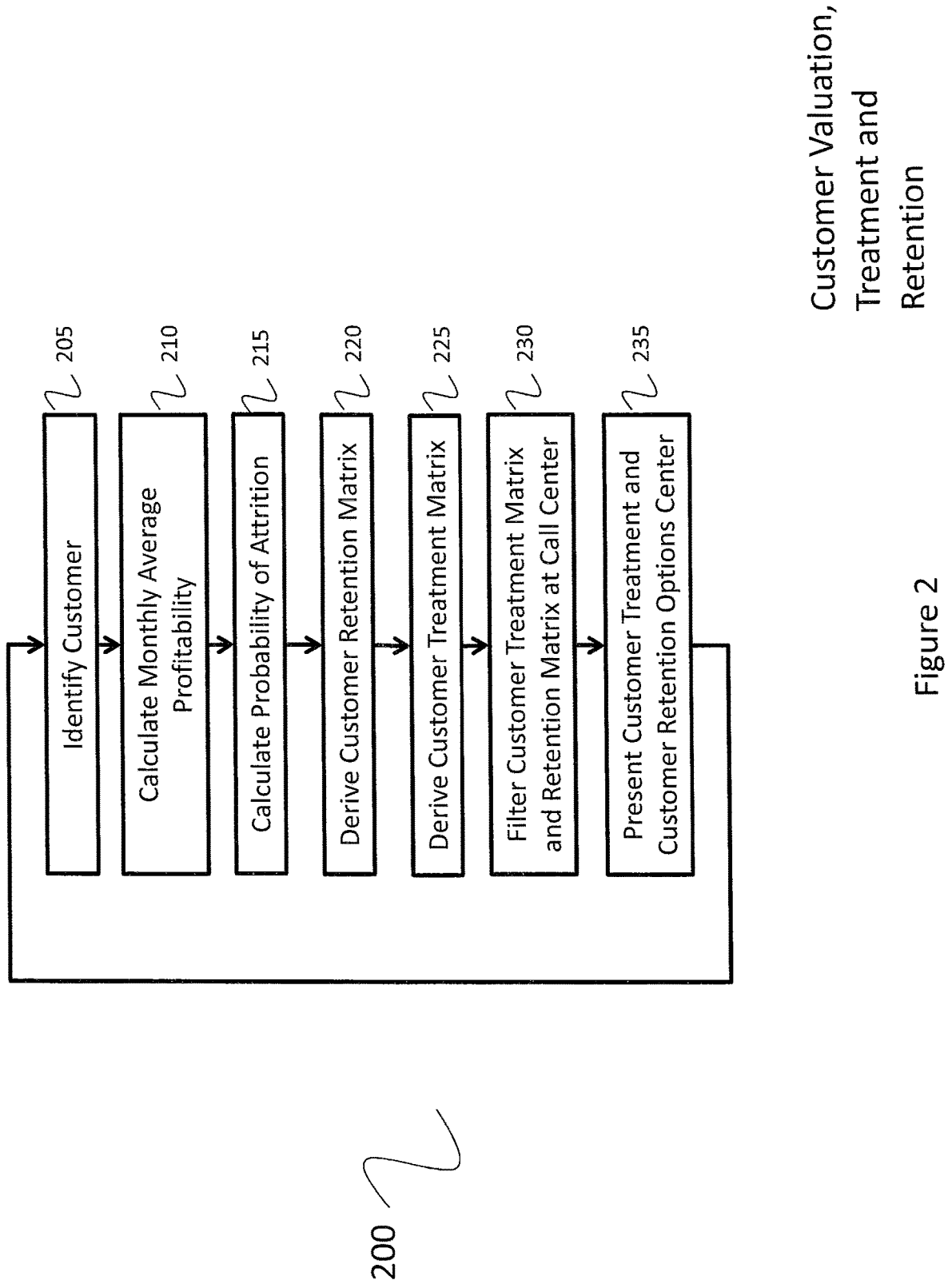
FIG. 2 is a flow chart of a method for customer valuation, treatment and retention.

Referring to FIG. 2, a customer retention process 200 is shown. Beginning with step 205, a customer is identified. For example, the customer calls into the call center with a question and the operator interacts with the customer valuation engine to make decisions about presenting offers in order to retain the customer or presenting treatment options where the customer is in arrears. At step 210, a monthly average profitability (MAP), as will be further described, is computed for the customer by the customer valuation engine. At step 215, a probability of attrition (PAT), as will be further described, is computed for the customer by the customer valuation engine. At step 220, a customer retention matrix depending upon MAP and PAT is assembled to provide rules for retaining the customer. At step 225, a customer treatment matrix depending on MAP and PAT is assembled to provide rules for dealing with treatment of an overdue account or the like. At step 230, the customer retention matrix and the customer treatment matrix are filtered, based on the MAP and PAT. At step 235, the customer retention matrix and the customer treatment matrix options are provided to the operator who can convey the options to the customer.

Figure 3A:
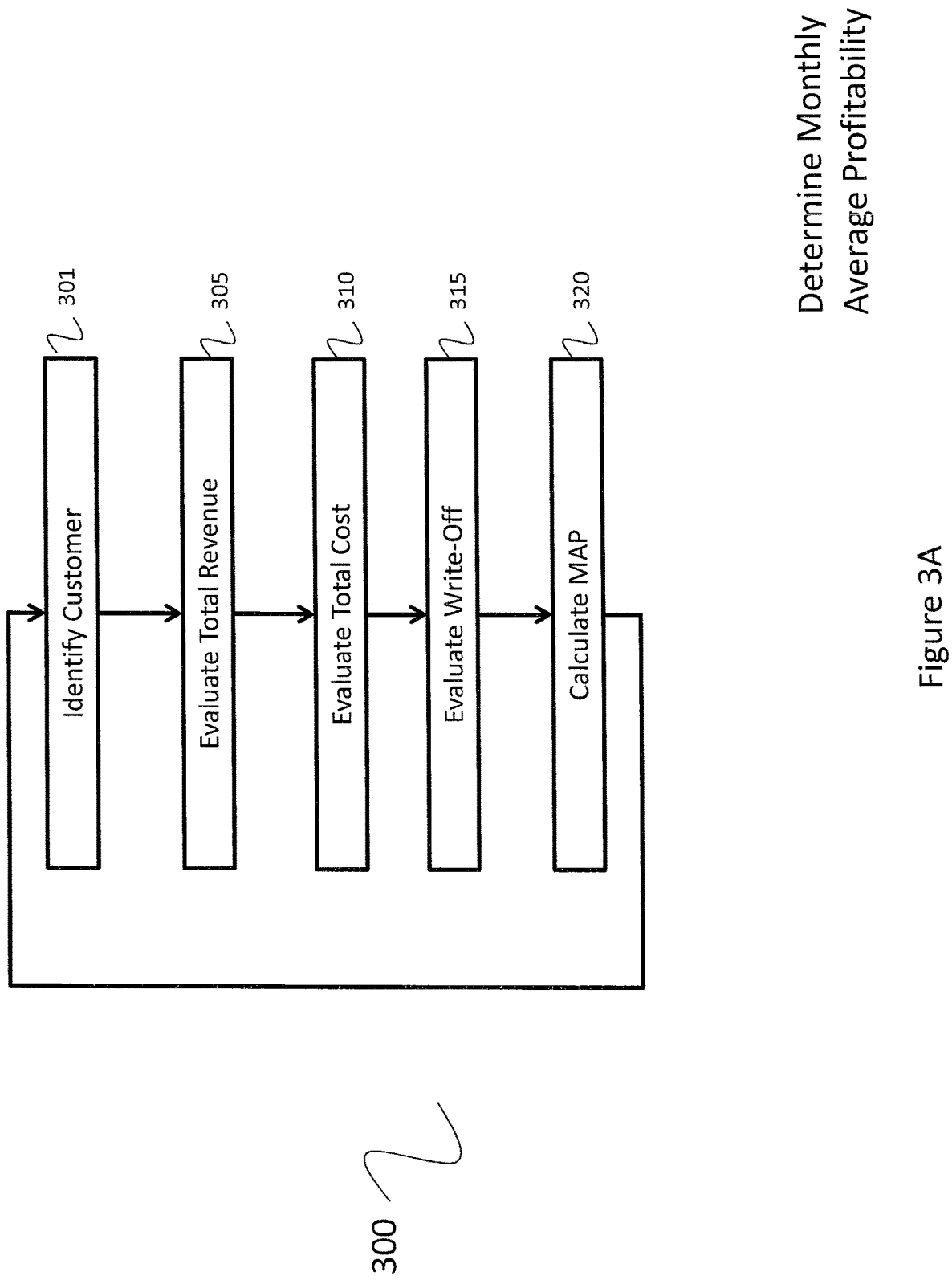
FIG. 3A is a flow chart of a method to determine monthly average profitability for an energy customer.

Referring to FIG. 3A, a method 300 for evaluation monthly average profitability is described. At step 301, a customer is identified for evaluation, for example, through interaction with the call center. At step 305, an average monthly revenue generated by the customer is determined for a number of months. At step 310, an average monthly cost of service for the customer is determined for the number of months. At step 315, a write-off amount is determined as a monthly average amount. If the energy provider has written off any outstanding debt from the customer, this is totaled in step 315 and averaged for the number of months. At step 320, the monthly average profitability is determined as $$\text{MAP} = REV - \text{COST} - WOB \qquad \text{Eq. 1}$$

where REV is the average monthly revenue amount,
COST is the average monthly cost amount, and,
WOB is the write off amount.

In a preferred embodiment, the number of months is the number of months since the date when energy was first delivered to the customer from the energy provider, which is referred to as the "months-on-book" (MOB).

Figure 3B:
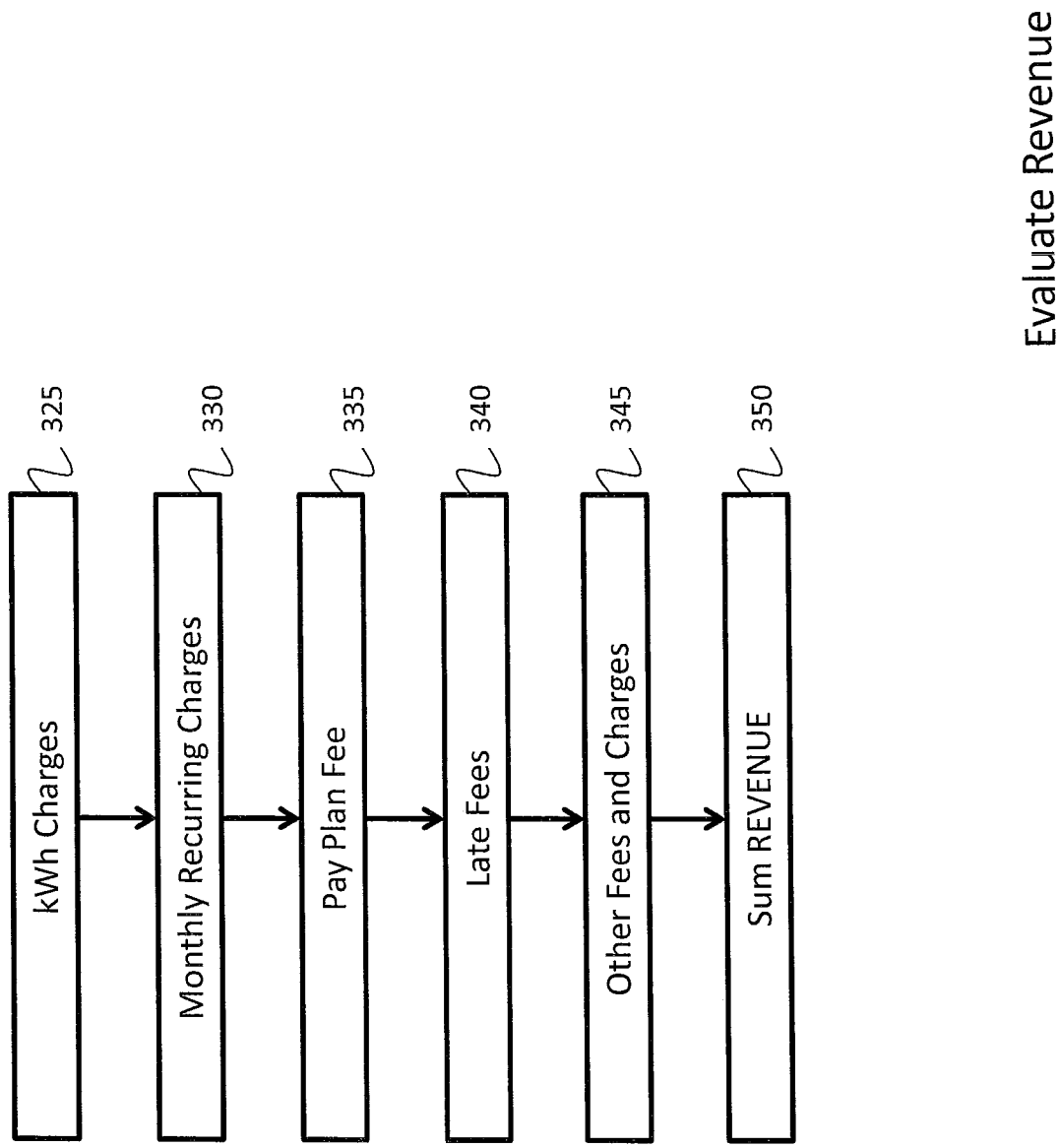
FIG. 3B is a flow chart of a method to evaluate revenue in support of monthly average profitability.

Referring to FIG. 3B, a method for evaluating revenue is described. At step 325, all of the kWh usage charges are totaled for the customer during the number of months. At step 330, all monthly recurring charges are totaled for the number of months. An example of a monthly recurring charge, is the transmission services charge passed through from the transmission and delivery company associated with the energy market operator.

At step 335, all payment plan fees are totaled for the number of months. An example of a payment plan fee is a monthly averaging plan.

At step 340, all late fees are totaled for the number of months and at step 345, all other fees and charges are totaled for the number of months. Examples of other fees and charges include, but are not limited to, contract cancelation fees, rebills, disconnect charges and (positive or negative) adjustments from the energy market operator.

At step 350, all of the totals from steps 325, 330, 335, 340 and 345 are summed and divided by the number of months to obtain an average revenue (REV) for the customer.

Figure 3C:
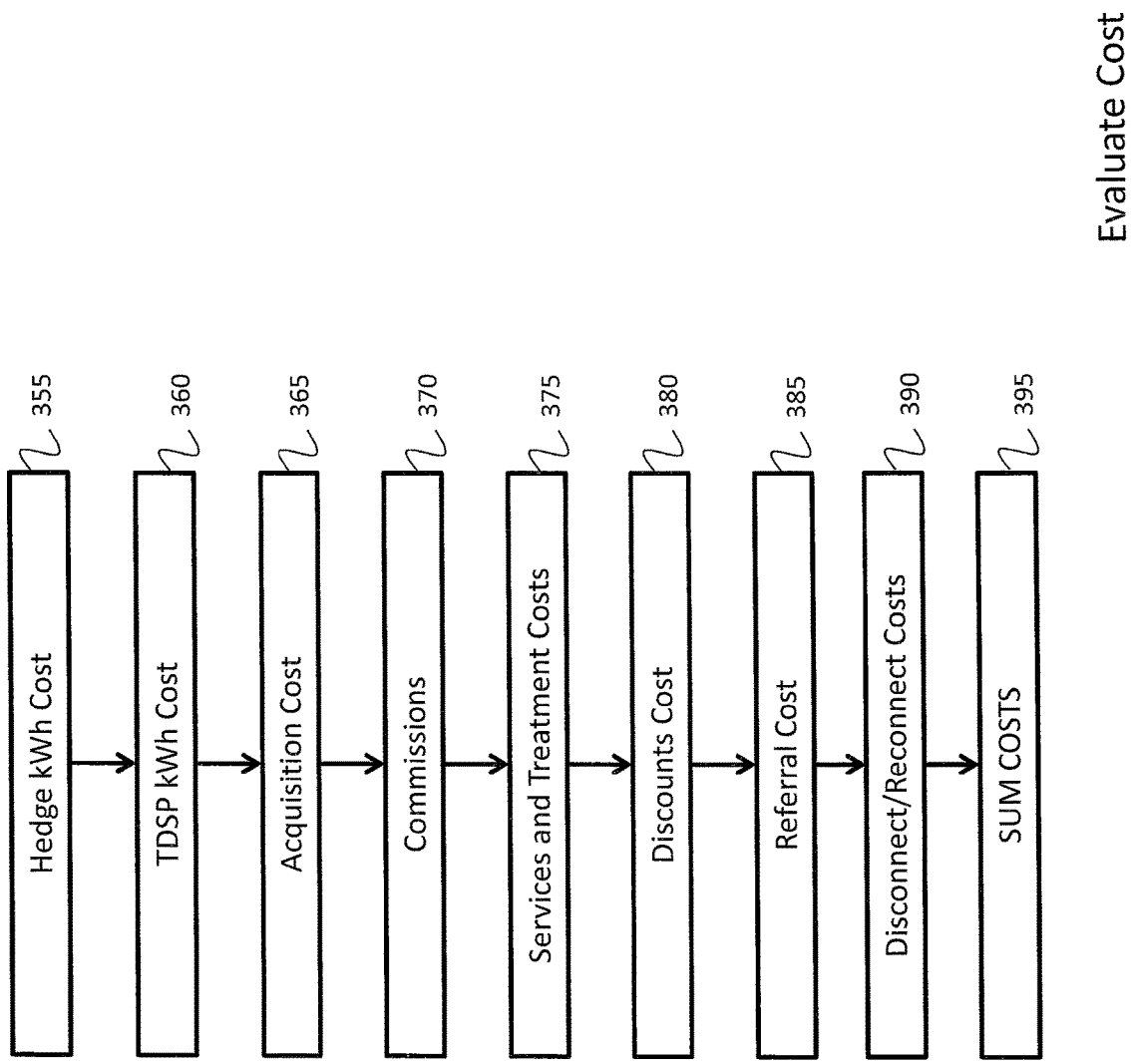
FIG. 3C is a flow chart of a method to evaluate cost of service in support of monthly average profitability.

Referring to FIG. 3C, a method for evaluating costs in support of MAP is described. At step 355, a hedge kWh usage cost is determined for the customer for the number of months. The hedge kWh usage cost is an average cost of purchasing electricity in advance for the customer based on a wholesale forecast of energy usage determined by the energy provider for all customers in a geographical region. At step 360, an actual kWh usage cost is totaled for the number of months. The actual kWh usage costs are transmitted to the energy provider by the energy market operator as invoice transactions describing measured readings from the energy meter for the customer. At step 360, there may also be service charges reported from the energy market operator which are monthly recurring charges passed-through to the customer.

At step 365, an acquisition cost for the customer is determined. The acquisition cost will be determined from the marketing channel from which the customer signed up and the costs per customer of that marketing channel A particular marketing channel of interest to this application is based on customer residual income for customers who sign up other customers for energy services and in turn receive commissions for those customers based on their energy bills. The customers receiving residual income become sales consultants for the energy provider. Such marketing channels have a low acquisition cost for the company using them, but may incur higher commission costs.

At step 370, commission costs for the energy customer are determined for the number of months as calculated by the commissions engine. In particular, residual income is generated for sales consultants based on the energy customer's usage and bill payments. The residual income is computed for multiple levels of sales consultants that may be mapped to the direct sales consultant who signed the energy customer into service. Sales consultants that are mapped to the direct sales consultant are also known as sponsors. For example, the direct sales consultant is sponsored by a first sponsor who is sponsored by a second sponsor and so forth to form a direct line to a top line sales consultant in a multi-level marketing system.

At step 375, a set of service costs associated with services and treatments are totaled for the customer over the number of months. Examples of service costs include inbound service cost, treatment costs, payment reminder cost, last chance cost and term expiration cost.

Inbound service cost is computed based on the number of inbound service calls made the customer into the call center. The call center costs are determined and averaged per customer per call to determine the inbound service cost.

Treatment cost is determined based on the number of treatment actions taken during the number of months, each type of action and the average cost per action. For example, a paper treatment letter warning the customer of a disconnect is mailed to a customer. So the cost of such a letter is taken into account.

A payment reminder cost is determined based on the number of payment reminders sent to the customer during the number of months.

A term expiration costs is determined based on the number of term expiration letters are sent to the customer during the number of months.

A "last chance" reminder cost is determined based on the number of last chance renewal letters and/or outbound telephone calls are sent to the customer during the number of months to engage the customer in renewing their term.

At step 380, a discounts cost is determined for the customer for discounts provided to the customer during the number of months.

At step 385, a referral cost is determined for the customer for each referral fee paid to the customer during the number of months where a referral fee is paid for referring another customer to the energy provider.

At step 390, a disconnect/reconnect cost is determined for the customer, for each disconnect or reconnect that the customer incurred during the number of months, based on an actual disconnect or reconnect charge billed by the energy market operator.

At step 395, all of the costs from steps 355, 360, 365, 370, 375, 380, 385 and 390 are summed and divided by the number of months to obtain an average monthly cost for the customer (COST).

Referring to FIG. 4, method 400 for determining PAT is described. Beginning with step 401, a customer is identified.

At step 405, a regional rate spread variable (RS) is evaluated for the region in which the customer is buying service. The regional rate spread is the difference between the customer's contracted energy rate and the current acquisition rate being offered to new customers in the region (offer rate).

At step 410, a length of service variable is determined for the customer. In a preferred embodiment this is just the number of months or MOB.

At step 415, an amount of energy usage (kWh) is determined for the customer as an average monthly energy usage in kWh, averaged over the MOB.

At step 420, the contract terms for the customer are evaluated. A first contract variable (TERM) is set according to the length of the current contract. A second contract variable (M2M) is set according to an amount of time that the customer has received service on a month-to-month basis without a contract during the number of months.

At step 425, a number of disconnects (DIS) is totaled for the customer over the number of months.

At step 430, an average late fee (LF) is determined for the customer by averaging all late fees for the customer over the number of months.

At step 435, a pricing segment variable (PS) is associated with the customer based on the marketing channel and the region for the customer. The pricing segment variable is an integer between 0 and 3.

At step 440, a DUN number variable (DUN) is determined for the customer from the customer's DUNS score. The DUN number is an integer between 1 and 3.

At step 445, an average billing variable (AB) is set to 1 if the customer uses average billing and set to zero if the customer does not use average billing.

At step 450, a pay plan variable (PP) is set to 1 if the customer has contracted to a payment plan and set to zero if the customer is not on a payment plan.

At step 455, PAT is computed from the set of variables determined in method 400. In a preferred embodiment, PAT is computed from a sigmoid function of a single variable that is a linear combination of the set of variables. For example, the sigmoid function is:

$$PAT = (1+e^{-Q})^{-1} \qquad \text{Eq. 2}$$

where Q is computed according to:

$$Q = -a + b(RS) - c(MOB) + d(DIS) + e(LF) - f(M2M) + g(S) + h(DUN) - i(kWh) - j(PP) - k(AB) - l(RP) - m(\text{TERM}) \qquad \text{Eq. 3}$$

The coefficients, a through m, are determined from a statistical analysis of historical data correlating each variable to an attrition rate. For example, a statistical study of the relationship of customer attrition to contract term can be undertaken. The statistical study accumulates a count of total customers T and customer attritions A at the end of each month. For each customer attrition, the TERM variable is determined (length of current contract). A histogram of the relative number of attritions R=A/T versus TERM is computed. Then a fit to a probability function similar to Eq. 2 is performed, such as $$R = (1+e^{(a+m \cdot \text{TERM})})^{-1}, \qquad \text{Eq. 4}$$

to determine the coefficients m and a, where a is the bias coefficient in Eq. 3. The bias coefficient can be estimated from the fit of Eq. 4 and by averaging over many fits in the statistical study of the other variables in Eq. 3. The bias coefficient a when equal to zero, means that all other known influences aside, the customer is equally likely to attrite as to remain with the energy provider.

Note that PAT designates a probability with values ranging from 0 (zero) to 1 (one). As Q tends to large positive numbers, PAT tends to 1 (one) and as Q tends to large negative numbers, PAT tends to 0 (zero). If all of the variables are evaluated to zero, or unknown, the probability of attrition is determined to be 50%.

Figure 5:
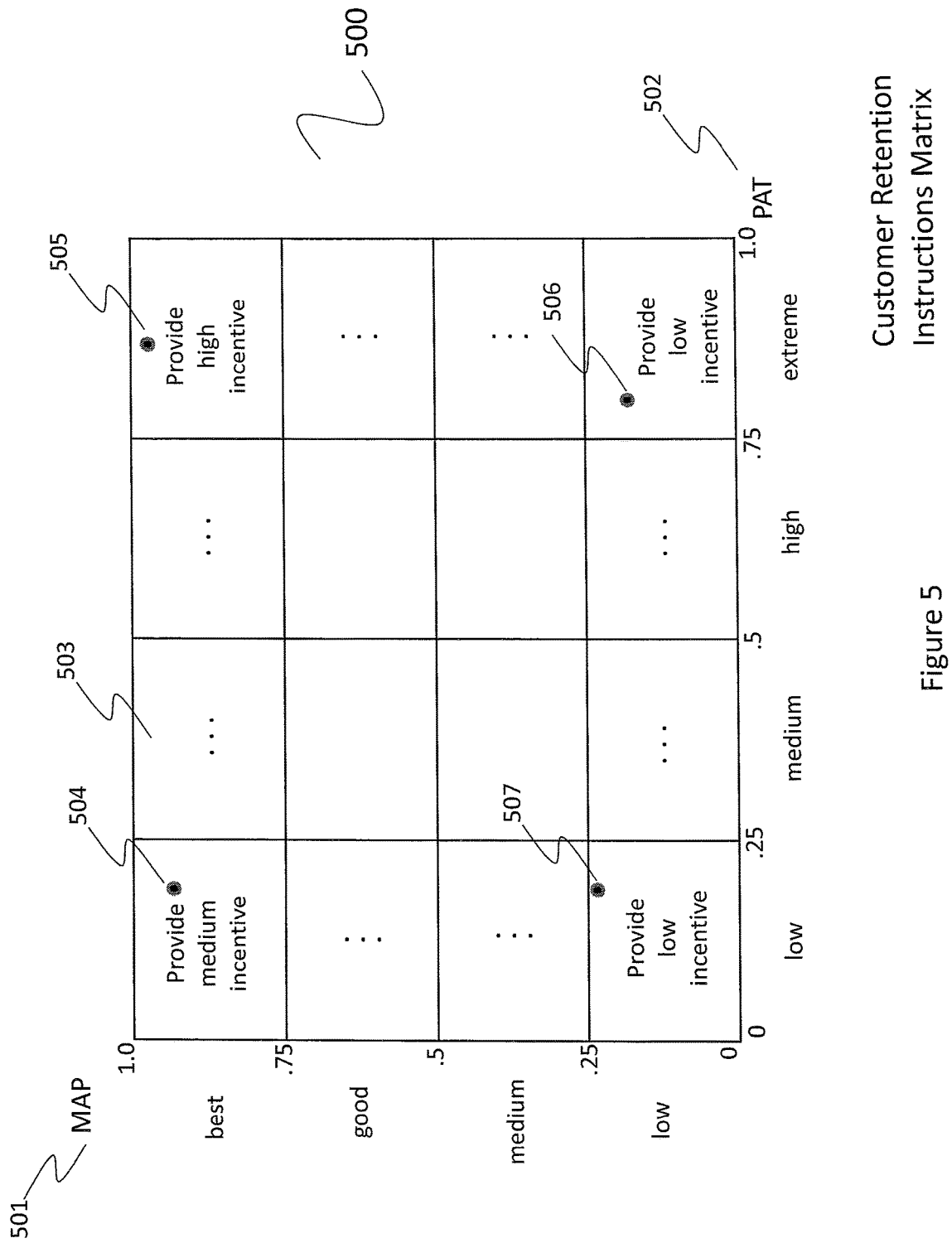
FIG. 5 is a graph of a customer retention instructions matrix.

Referring to FIG. 5, a preferred embodiment is disclosed for using MAP and PAT to determine a set of customer incentives available to a call center operator. The matrix 500 includes MAP and PAT. In FIG. 5, MAP is shown on vertical axis 501 and PAT is shown on horizontal axis 502. MAP is subdivided into four categories: "low," "medium," "good" and "best" customer profitability where low corresponds to zero or negative profitability and best corresponds to large positive profitability. PAT is subdivided into four categories: "low," "medium," "high" and "extreme" values for likelihood of attrition, where "low" is near zero (customer stays) and "high" is near one (customer leaves). Of course, other numbers of categories may be employed.

The subdivisions of MAP and PAT result in a set of blocks 503. MAP and PAT values, when mapped to matrix 500, identify a particular block having a particular set of incentive instructions for a call operator. In a preferred embodiment, the MAP and PAT for a customer filter only those set of incentives defined in the corresponding block and the server configures and presents a web page with only the filtered incentives to the call center operator. For example, point 505 indicates a relatively high MAP value of about 0.9 and a relatively high PAT value of about 0.85, identifying a range of high incentives for the corresponding customer. Another point 507 indicates a relatively low MAP value of about 0.2 and a relatively high PAT value of about 0.8, identifying a range of low incentives. Point 506 indicates a relatively low MAP value of about 0.25 and a relatively low PAT value of about 0.2 identifying a range where low incentives are offered. Point 504 indicates a relatively high MAP value of about 0.9 and a relatively low PAT value of about 0.2 identifying a range where a medium value incentive may be offered.

In this case, the sets of incentives may be used to help retain customers. The set of incentives can change from region to region and time of year and have a range of monetary values. For example, a high incentive might be to offer one month's energy bill, free of charge or offer $100 off the customer's next bill. A lesser incentive, might be to offer forgiveness on an existing late fee or on a next late fee. The set of incentives can be low incentives, for example, offering no monetary incentives while limiting the time with the customer while on the phone or by referring them into an automated telephone system.

Figure 6:
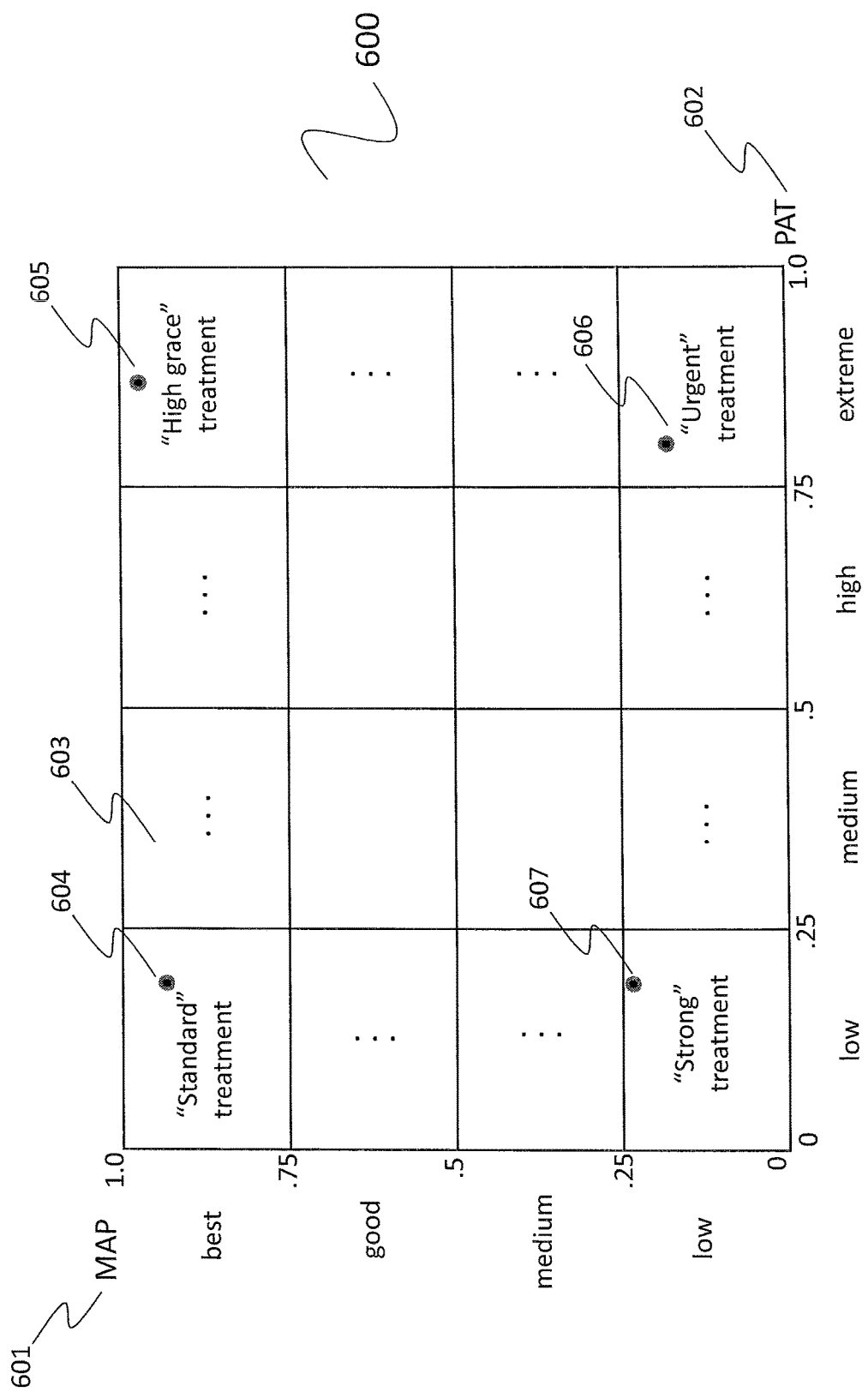
FIG. 6 is a graph of a customer treatment instructions matrix.

Referring to FIG. 6, a preferred embodiment is disclosed for using MAP and PAT to determine a set of customer treatment options available to a call center operator. The matrix 600 includes MAP and PAT. In FIG. 6, MAP is shown on vertical axis 601 and PAT is shown on horizontal axis 602. MAP is subdivided into "low," "medium," "good" and "best" customer profitability, referenced numerically. PAT is subdivided into "low," "medium," "high" and "extreme" likelihood of attrition, referenced numerically.

The subdivisions of MAP and PAT result in a set of blocks 603. MAP and PAT values, when mapped to matrix 600, identify a particular block having a particular set of treatment instructions for a call operator. In a preferred embodiment, the MAP and PAT for a customer filter only those set of treatment instructions defined in the corresponding block and the server configures and presents a web page with only the filtered treatment instructions to the call center operator. For example, point 604 indicates a relatively high MAP value of about 0.9 and a relatively low PAT value of about 0.2 identifying a block where a relatively "standard" treatment may be instructed. Point 605 indicates a relatively high MAP value of about 0.9 and a relatively high PAT value of about 0.85, identifying a block with "high grace" treatment instructions for the call operator. Another point 606 indicates a relatively low MAP value of about 0.2 and a relatively high PAT value of about 0.8, identifying a block with a set of "urgent" treatment instructions. Point 607 indicates a relatively low MAP value of about 0.25 and a relatively high PAT value of about 0.2 identifying a block of "strong" treatment instructions.

In this case, a set of "standard" or careful treatment instructions may be used to help retain good customers while allowing for collection of bills in arrears. A set of "urgent" treatment instructions may be used for obtaining uncollected bills and to remove poor quality customers, especially poor quality customers that are about to leave anyway. The set of treatment instructions can change from region to region and time of year. For example, a high grace treatment might be to remind the customer that they are missing out on a particular benefit because they are behind in payments. A standard treatment may be to extend the time to pay without consequence, but clearly define the consequence. A strong treatment incurs a normal procedure of sending late notices, collection notices and disconnect notices without further extension of time. An urgent treatment instruction may be to demand payment from the customer immediately and communicate an impending consequence such as a disconnect order.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A system for confirming and utilizing data integrity in an energy procurement and distribution system comprising:
   an SQL database subsystem;
   a market transaction manager, operatively connected to the SQL database subsystem;
   a business rules and requirements processor, operatively connected to the SQL database subsystem;
   a usage rater, operatively connected to the SQL database subsystem;
   a customer analysis and quality control auditor, operatively connected to the SQL database subsystem;
   a customer billing processor and collections manager, operatively connected to the SQL database subsystem;
   a customer payment processor, operatively connected to the SQL database subsystem;
   a third party sales and marketing subsystems API, operatively connected to the SQL database subsystem;
   a customer acquisition and residual web interface, operatively connected to the SQL database subsystem;
   a customer service and executive back office system, operatively connected to the SQL database subsystem;
   the customer service and executive back office system further comprising:
   a retail electricity provider (REP) server, having a first set of processors and a first set of memories, attached to a network;
   an independent system operator (ISO) server, having a second set of processors and a second set of memories, in communication with the REP server, through the network;
   a transmission and distribution service provider (TDSP) server, having a third set of processors and a third set of memories, in communication with the REP server, through the network;
   the first set of memories, the second set of memories, and the third set of memories containing a set of instructions that cause the system to:
      receive a set of electronic data interchange (EDI) transactions corresponding to a set of electronic service identifiers (ESIIDs) from the ISO server;
      group the set of EDI transactions according to a set of functions, to implement a set of disposition channels;
      an enrollment disposition channel, of the set of disposition channels, for identifying a set of rejected enrollment EDI transactions and a set of accepted enrollment EDI transactions, based on the data integrity, and sending a first electronic signal through the network to the TDSP server enabling an electronic meter read operation for an accepted enrollment EDI transaction of the set of accepted enrollment EDI transactions;
      a service termination disposition channel, of the set of disposition channels, for identifying a set of rejected service termination EDI transactions and a set of accepted service termination EDI transactions based on the data integrity and receiving a second electronic signal through the network at the TDSP server, enabling an electronic service termination operation of the set of accepted service termination EDI transactions;
      a wholesale forecasting disposition channel, of the set of disposition channels, for grouping the set of EDI transactions according to a weather zone, importing a set of weather data for the weather zone and determining a scaled forecast profile for a first ESIID, of the set of ESIIDs, from the set of weather data;

receiving a third electronic signal at the ISO server reserving an energy procurement based on the data integrity, and based on the scaled forecast profile;

displaying the set of rejected enrollment EDI transactions and the set of rejected service termination EDI transactions, of the set of EDI transactions;

a treatment disposition channel for controlling a treatment process;

the treatment process further comprising:

accessing a set of customer retention instructions, stored in the first set of memories;

accessing a set of customer treatment instructions, stored in the first set of memories;

accessing a customer retention matrix, stored in the first set of memories; and, accessing a customer treatment matrix, stored in the first set of memories;

receiving, a record of energy usage for an energy customer, a record of energy prices for the energy customer, a record of energy costs for the energy customer, a record of bills sent to the energy customer, and a record of payments received from the energy customer;

generating a monthly average profitability for the energy customer based on the record of payments received and the record of energy costs;

generating a probability of attrition from the record of energy prices, the record of energy usage, the record of bills sent to the energy customer, and the record of payments received from the energy customer;

selecting a subset of customer retention instructions from the set of customer retention instructions based on the monthly average profitability, the probability of attrition, and the customer retention matrix;

selecting a subset of customer treatment instructions from the set of customer treatment instructions based on the monthly average profitability, the probability of attrition, and the customer treatment matrix;

generating a code set for a web page, the code set containing the subset of customer retention instructions and the subset of customer treatment instructions;

transmitting the code set for the web page;

wherein the code set when executed:

displays the subset of customer retention instructions; and displays the subset of customer treatment instructions;

calculating the probability of attrition from a sigmoid function according to:

probability of attrition=$(1+e^{-Q})^{-1}$;

where Q is computed according to:

$Q = -a + b(RS) - c(MOB) + d(DIS) + e(LF) - f(M2M) + g(S) + h(DUN) - i(kWh) - j(PP) - k(AB) - l(RP) - m(TERM)$ where coefficients, a through m, are determined from correlating each variable to an attrition rate with a statistical study of a relationship of customer attrition to contract term;

where RS is a regional rate spread that is a difference between an energy customer's contracted energy rate and a current acquisition rate offered to a new energy customer in a region;

where MOB is a number of months-on-book since a date when energy was first delivered to the energy customer from an energy provider of the energy customer;

where DIS is a number of disconnects of the energy customer over the number of months-on-book;

where LF is an average late fee over the number of months-on-book for the energy customer;

where M2M is an amount of time that the energy customer has received service on a month-to-month basis without a contract during the number of months-on-book;

where DUN is a number variable determined for the energy customer from a DUNS score of the energy customer and is an integer between 1 and 3;

where kWh is an amount of energy usage determined for a customer as an average monthly energy usage in kWh averaged over the MOB;

where PP is a pay plan variable that is set to 1 if the energy customer has contracted to a payment plan and set to zero if the customer is not on a payment plan;

where AB is an average billing variable that is set to 1 if the customer uses average billing and set to zero if the customer does not use average billing; and where TERM is a first contract variable that is set according to a length of a current contract between the energy customer and the REP.

2. The system of claim 1, wherein the treatment process further comprises:

providing a first incentive with the subset of customer retention instructions when the monthly average profitability is below a first monthly average profitability threshold.

3. The system of claim 2, wherein the treatment process further comprises:

providing a second incentive, the first incentive lower than the second incentive, with the subset of customer retention instructions when the monthly average profitability is above a second monthly average profitability threshold and the probability of attrition is below a first probability of attrition threshold.

4. The system of claim 3, wherein the treatment process further comprises:

providing a third incentive, the third incentive higher than the second incentive, with the subset of customer retention instructions when the monthly average profitability is above a second monthly average profitability threshold and the probability of attrition is above a second probability of attrition threshold.

5. The system of claim 4, wherein the treatment process further comprises:

providing a first treatment, identified as a "strong" treatment, with the subset of customer treatment instructions when the monthly average profitability is below a third monthly average profitability threshold and the probability of attrition is below a third probability of attrition threshold.

6. The system of claim 5, wherein the treatment process further comprises:

providing a second treatment, identified as an "urgent" treatment, with the subset set of customer treatment instructions when the monthly average profitability is below the third monthly average profitability threshold and the probability of attrition is above a fourth probability of attrition threshold.

7. The system of claim 6, wherein the treatment process further comprises:

providing a third treatment, identified as a "standard" treatment, with the subset of customer treatment instructions when the monthly average profitability is above a fourth monthly average profitability threshold and the probability of attrition is below the third probability of attrition threshold.

8. The system of claim 7, wherein the treatment process further comprises:
providing a fourth treatment, identified as a "high grace" treatment, with the subset of customer treatment instructions when the monthly average profitability is above the fourth monthly average profitability threshold and the probability of attrition is above the fourth probability of attrition threshold.

9. The system of claim 8, wherein the statistical study further comprises:
Accumulating, monthly, a count of total customers "T" and a count of total customer attritions "A";
determining TERM for each customer attrition, of a set of customer attritions;
computing a histogram related to TERM, according to:

$$R=A/T;$$

where R is a relative number of attritions; and performing a fit according to:

$$R=(1+e^{(a+m \cdot TERM)})^{-1}.$$

10. The system of claim 1, wherein the set of disposition channels further comprises:
a validate TDSP invoice channel, for confirming a TDSP invoice amount;
the validate TDSP invoice channel further incorporating the steps of:
receiving a TDSP invoice transaction, of the set of EDI transactions, the TDSP invoice transaction having a first cross reference number;
receiving a monthly usage transaction, of the set of EDI transactions, the monthly usage transaction having a second cross reference number;
comparing the first cross reference number with the second cross reference number to derive a match condition; and,
logging a first exception if the match condition is false.

11. The system of claim 10, wherein the validate TDSP invoice channel further incorporates the steps of:
identifying a set of unknown TDSP charges in the TDSP invoice transaction; and,
logging a second exception related to the set of unknown TDSP charges and the TDSP invoice transaction.

12. The system of claim 1, wherein the set of disposition channels further comprises:
a prebill quality control disposition channel for locating a set of exceptions in a set of billable usages;
the prebill quality control disposition channel further incorporates the steps of:
receiving a monthly usage transaction, of the set of EDI transactions, the monthly usage transaction having a second ESIID of the set of ESIIDs;
receiving a TDSP invoice transaction, of the set of EDI transactions, the TDSP invoice transaction having a third ESIID of the set of ESIIDs;
comparing the second ESIID to the third ESIID to determine a first match condition; and,
logging a first exception, of the set of exceptions, if the first match condition is false.

13. The system of claim 12, wherein the monthly usage transaction includes a set of net internal usage data;
wherein the TDSP invoice transaction contains a set of meter read quantity data; and,
wherein the prebill quality control channel further incorporates the steps of:
comparing the set of net internal usage data to the set of meter read quantity data for a second match condition; and,
logging a second exception if the second match condition is false.

14. The system of claim 1, wherein the set of disposition channels further comprises:
an inbound service order response disposition channel for identifying a set of rejected service order request EDI transactions of the set of EDI transactions;
the inbound service order response disposition channel further comprising the steps of:
receiving an inbound service order response EDI transaction, of the set of EDI transactions, the inbound service order response EDI transaction having an electronic purpose code;
validating a comparison between an originating ESIID and a second ESIID of the set of ESIIDs;
interpreting the electronic purpose code to be one of a group of reject, unexecutable, accept or complete;
designating a customer record as rejected when the electronic purpose code is interpreted as one of reject and unexecutable; and,
designating the customer record as one of disconnect non-pay and reconnect non-pay when the electronic purpose code is interpreted as one of accept or complete.

15. The system of claim 1, wherein the set of disposition channels further comprises:
a completed unexecutable/permit required disposition channel for identifying a set of rejected completed unexecutable/permit required EDI transactions of the set of EDI transactions;
the completed unexecutable/permit required disposition channel further comprising the steps of:
comparing a second ESIID related to a completed unexecutable/permit required EDI transaction of the set of EDI transactions to a third ESIID in a customer record to determine a match condition; and,
rejecting the completed unexecutable/permit required EDI transaction if the match condition is false.

16. The system of claim 1, wherein the set of disposition channels further comprises:
a historical usage response disposition channel for identifying a set of rejected completed unexecutable/permit required EDI transactions of the set of EDI transactions;
the historical usage response disposition channel further comprising the steps of:
comparing a second ESIID related to a historical usage response EDI transaction, of the set of EDI transactions, to a third ESIID in a customer record to determine a match condition; and,
rejecting the historical usage response EDI transaction if the match condition is false.

17. The system of claim 1, wherein the set of disposition channels further comprises:
a move out response disposition channel for identifying a set of rejected completed unexecutable/permit required EDI transactions of the set of EDI transactions;
the move out response disposition channel further comprising the steps of:
comparing a second ESIID related to a move out response EDI transaction, of the set of EDI transactions, to a third ESIID in a customer record to determine a match condition; and, rejecting the move out response EDI transaction if the match condition is false.

18. The system of claim 1, wherein the set of disposition channels further comprises:
a move in response disposition channel for identifying a set of rejected completed unexecutable/permit required EDI transactions of the set of EDI transactions;
the move in response disposition channel further comprising the steps of:
comparing a second ESIID related to a move in response EDI transaction, of the set of EDI transactions, to a third ESIID in a customer record to determine a match condition; and,
rejecting the move in response EDI transaction if the match condition is false.

* * * * *